P. R. BRADLEY.
PIPE OR HOSE COUPLING.
APPLICATION FILED MAY 9, 1911.
1,022,927.
Patented Apr. 9, 1912.
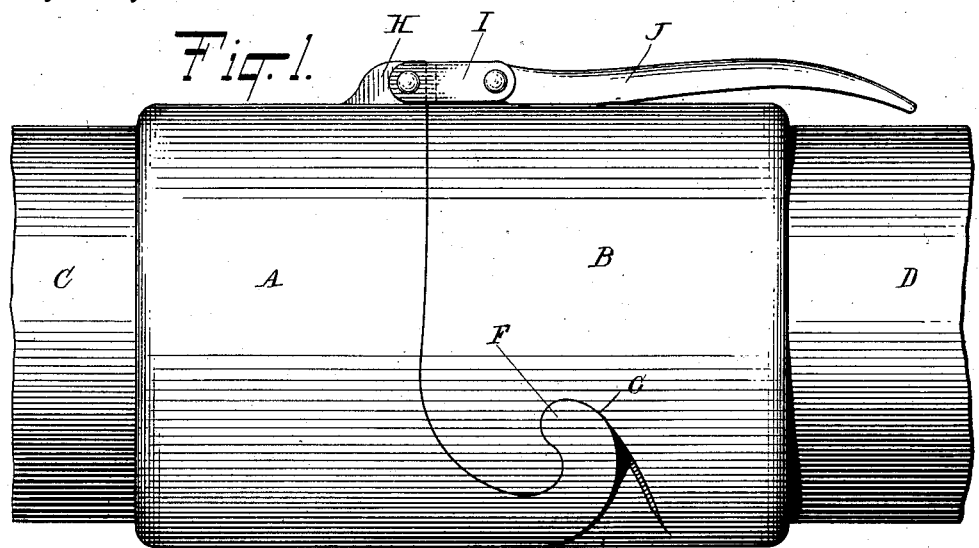
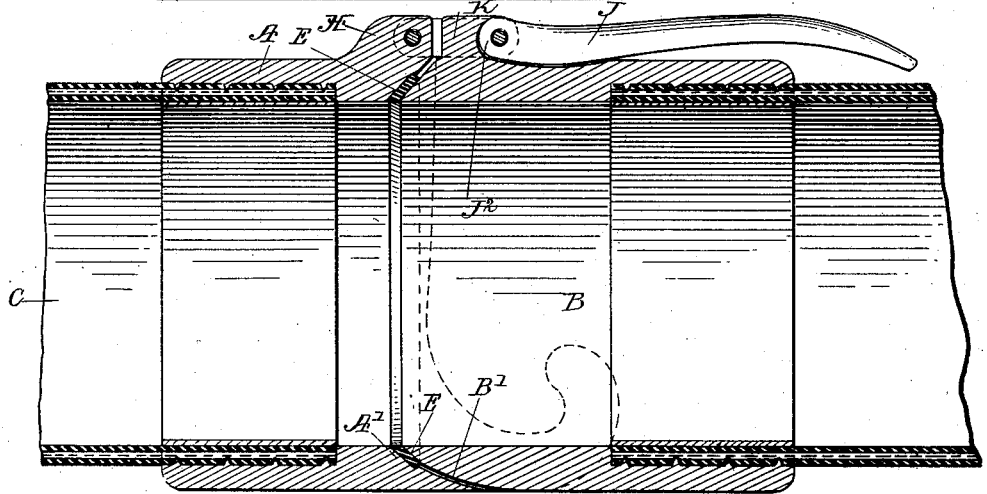
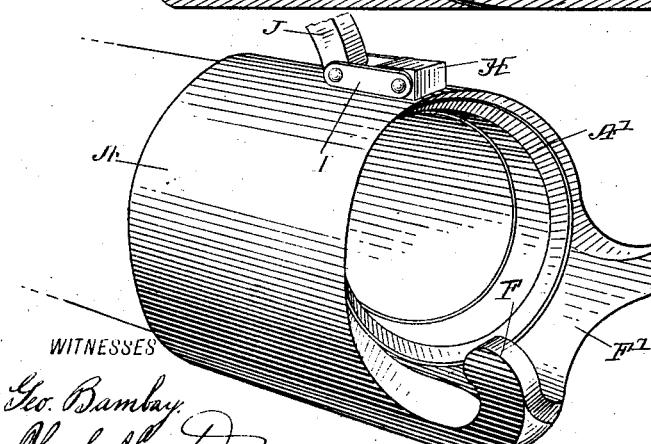
WITNESSES
INVENTOR
Philo R. Bradley
BY
ATTORNEYS

UNITED STATES PATENT OFFICE.

PHILO R. BRADLEY, OF WEST NEW YORK, NEW JERSEY, ASSIGNOR OF ONE-HALF TO GEORGE WINKLER, OF WEST NEW YORK, NEW JERSEY.

PIPE OR HOSE COUPLING.

1,022,927. Specification of Letters Patent. Patented Apr. 9, 1912.

Application filed May 9, 1911. Serial No. 626,116.

*To all whom it may concern:*

Be it known that I, PHILO R. BRADLEY, a citizen of the United States, and a resident of West New York, in the county of Hudson and State of New Jersey, have invented a new and Improved Pipe or Hose Coupling, of which the following is a full, clear, and exact description.

The object of the invention is to provide a new and improved pipe or hose coupling, arranged to permit convenient and quick coupling and uncoupling of the members of the coupling, and to prevent leakage of the liquid passing through the coupling.

For the purpose mentioned, the coupling is formed of male and female coupling members having a separable hinged connection lying within the peripheral faces of the members, and a cam lug mounted on one coupling member and engaging a lug on the other coupling member.

A practical embodiment of the invention is represented in the accompanying drawings forming a part of this specification, in which similar characters of reference indicate corresponding parts in all the views.

Figure 1 is a side elevation of the coupling, showing the members in closed and locked position; Fig. 2 is a sectional side elevation of the same; and Fig. 3 is a perspective view of the female coupling member.

The coupling consists essentially of the female coupling member A and the male coupling member B, connected at their outer ends with the ends of pipes or hose C and D, and the female coupling member A is provided at the coupling end with a conical seat A′ adapted to be engaged by a similarly shaped projection B′ formed on the engaging end of the male coupling member B. A packing ring E is held on the seat A′ and is adapted to be engaged by the projection B′ of the coupling member B so as to prevent leakage at the joint of the coupling members A and B, at the time the said coupling members are in a closed and locked position. The coupling member A is provided with integral hooks F projecting beyond the seat A′ and adapted to engage bearings G formed exteriorly on the coupling member B so as to provide a hinged connection between the coupling members A and B. The hooks F and the bearings G are arranged within the peripheral faces of the coupling members A and B, so that the hinged connection does not form any obstruction whatever on the coupling members A and B.

On the top of the coupling member A is arranged a lug H, on which is fulcrumed a link I pivotally connected with a cam lever J adapted to engage with its cam end $J^2$ a cam lug K formed on top of the coupling member B directly opposite the lug H. The lug H and the hooks F are spaced approximately equal distances apart, and the bearings G and the lug K are similarly arranged so that when the coupling members A and B are in engagement with each other and the lever J is swung into a closed position, as shown in Figs. 1 and 2, then the projection B′ is forced in firm contact with the packing ring E, to insure a proper locking of the coupling members A and B, with the pressure equally distributed all around the packing ring E, thus insuring a tight joint and thereby preventing leakage of the liquid passing through the coupling.

It is understood that when coupling the members A and B, the hooks F are first engaged with the bearings G to form a hinged connection between the members, and thus allow of swinging the members A and B toward each other into closed position, that is, with the projection B′ engaging the packing ring E. When this has been done, the operator swings the lever J and the link I over into the position indicated in Figs. 1 and 2, to engage the cam end $J^2$ of the cam lever J with the curved back portion of the cam lug K, to draw the two coupling members A and B firmly together, at the same time swinging the lever J far enough down on the coupling member B to hold the cam lever J against accidental unlocking as the lever J passes its central position relative to its pivotal connection with the link I. When it is desired to uncouple, it is only necessary for the operator to swing the cam lever J upward to disengage the cam end $J^2$ from the lug K, and to then swing the lever J and with it the link I over onto the coupling member A, to unlock the coupling members A and B and allow of swinging the same open on the hinged connection formed by the hooks F and the bearings G.

In order to render the coupling exceedingly strong and durable, the hooks F are preferably connected by a rib F', as plainly indicated in Fig. 3.

Having thus described my invention, I claim as new and desire to secure by Letters Patent:

A coupling, comprising male and female members, of which the female member is provided with a conical seat and the male member is provided with a conical projection adapted to be seated on the said seat, curved hooks integral on the female coupling member and projecting therefrom and having a web connecting their projecting portions, curved bearings formed in the peripheral face of the male coupling member and adapted to be engaged by the said hooks, and locking means for locking the said coupling members together, the said locking means and hooks being spaced equidistantly apart.

In testimony whereof I have signed my name to this specification in the presence of two subscribing witnesses.

PHILO R. BRADLEY.

Witnesses:
　THEO. G. HOSTER,
　PHILIP D. ROLLHAUS.

Copies of this patent may be obtained for five cents each, by addressing the "Commissioner of Patents, Washington, D. C."